United States Patent
Tran et al.

(10) Patent No.: US 7,237,065 B2
(45) Date of Patent: Jun. 26, 2007

(54) CONFIGURABLE CACHE SYSTEM DEPENDING ON INSTRUCTION TYPE

(75) Inventors: Thang M. Tran, Austin, TX (US); Raul A. Garibay, Jr., Austin, TX (US); Muralidharan S. Chinnakonda, Austin, TX (US); Paul K. Miller, Dripping Springs, TX (US)

(73) Assignee: Texas Instruments Incorporated, Dallas, TX (US)

( * ) Notice: Subject to any disclaimer, the term of this patent is extended or adjusted under 35 U.S.C. 154(b) by 25 days.

(21) Appl. No.: 11/136,169

(22) Filed: May 24, 2005

(65) Prior Publication Data
US 2006/0271738 A1    Nov. 30, 2006

(51) Int. Cl.
*G06F 12/00* (2006.01)
(52) U.S. Cl. .................. 711/122; 711/138; 711/139
(58) Field of Classification Search ............ None
See application file for complete search history.

(56) References Cited

U.S. PATENT DOCUMENTS

| | | | |
|---|---|---|---|
| 5,590,352 A | 12/1996 | Zuraski, Jr. et al. | |
| 5,737,629 A | 4/1998 | Zuraski, Jr. et al. | |
| 5,802,588 A | 9/1998 | Ramagopal et al. | |
| 5,878,245 A | 3/1999 | Johnson et al. | |
| 6,108,769 A | 8/2000 | Chinnakonda et al. | |
| 6,209,084 B1 | 3/2001 | Chinnakonda et al. | |
| 6,249,862 B1 | 6/2001 | Chinnakonda et al. | |
| 6,298,423 B1 | 10/2001 | Johnson et al. | |
| 6,643,745 B1 * | 11/2003 | Palanca et al. | ............ 711/138 |
| 6,889,314 B2 | 5/2005 | Samra et al. | |
| 7,076,612 B2 * | 7/2006 | Emons | ............ 711/138 |
| 2003/0061466 A1 | 3/2003 | Samra et al. | |
| 2003/0196058 A1 | 10/2003 | Ramagopal et al. | |
| 2003/0196072 A1 | 10/2003 | Chinnakonda et al. | |
| 2004/0158694 A1 | 8/2004 | Tomazin et al. | |
| 2006/0112234 A1 * | 5/2006 | Cabot et al. | ............ 711/138 |

* cited by examiner

*Primary Examiner*—Reginald Bragdon
*Assistant Examiner*—Mehdi Namazi
(74) *Attorney, Agent, or Firm*—Ronald O. Neerings; Wade James Brady, III; Frederick J. Telecky, Jr.

(57) ABSTRACT

A processor comprises decode logic that determines an instruction type for each instruction fetched, a first level cache, a second level cache coupled to the first level cache, and control logic operatively coupled to the first and second level caches. The control logic preferably causes cache linefills to be performed to the first level cache upon cache misses for a first type of instruction, but precludes linefills from being performed to the first level cache for a second type of instruction.

28 Claims, 2 Drawing Sheets

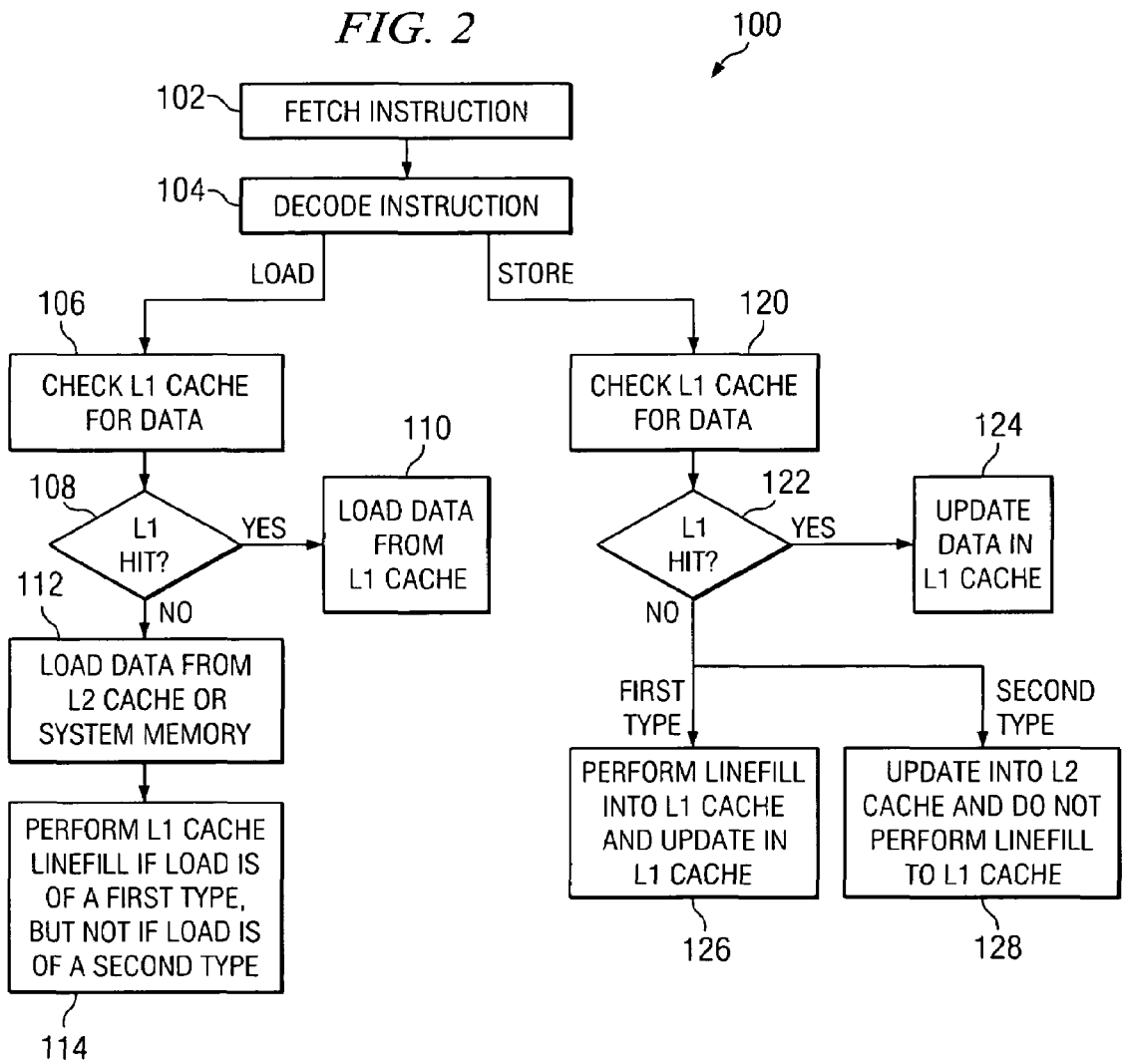

CONFIGURABLE CACHE SYSTEM DEPENDING ON INSTRUCTION TYPE

BACKGROUND

On-chip caches are used in various microprocessor designs to improve performance by storing frequently used information in fast on-chip cache memories. The performance is improved because information can be retrieved quickly during program execution. Some systems have multiple levels of cache. An "L1" cache typically is relatively small, but the access time is very fast. An "L2" cache is typically larger than the L1 cache, but has a slower access time than the L1 cache.

Upon encountering a "load" instruction, which attempts to retrieve data from a target memory location, the processor first determines whether the target data is already resident in the L1 cache. If the data is in the L1 cache (called a cache "hit"), then the target data is retrieved from the L1 cache. If the data is not in the L1 cache (a cache "miss"), the processor next determines whether the target data is in the L2 cache. If it is, then the target data is retrieved from the L2 cache. Finally, if the target data is in neither the L1 nor L2 caches, the target data is retrieved from system memory, which is larger and slower than either the L1 or L2 caches.

In some systems, a miss in the L1 cache for a load instruction will result in the target data being copied into the L1 cache from wherever it is currently located (L2 cache or system memory). In general, cache misses hurt performance but cache hits increase performance. In general, an L1 and/or L2 cache miss hurts processor performance as the processor must wait for data to return before executing subsequent instructions. By bringing the target data into the fastest L1 cache memory, any subsequent need for the data can be quickly satisfied from the L1 cache. While bringing the target data into the L1 cache is a fairly extensive process requiring multiple clock cycles, doing so may pay dividends upon subsequent accesses to the data once it is in the L1 cache. Performance may thereby be improved.

Cache systems take advantage of two effects—temporal locality and spatial locality. Temporal locality means that, once a piece of data is accessed, that same data is likely to be needed again in the near future. Spatial locality means that, once a piece of data is accessed, nearby data (e.g., data in contiguous memory locations) is likely to be accessed in the near future. When data is copied to the L1 cache, the target data, as well as contiguously surrounding data, is copied into a "line" of the L1 cache. This process improves system performance in the event that any of the nearby data is subsequently needed, which may occur in data sets with a high degree of spatial locality.

Data sets that have relatively low spatial and/or temporal locality tend to "pollute" cache memory. This means that some data may be stored in the cache, but is not likely to be needed in the near future. Such data occupies space which data that is more suitable for cache usage could otherwise occupy. This problem is particularly troublesome for L1 caches because of their relatively small size.

SUMMARY

Various embodiments are disclosed to address one or more of issues noted above. In one embodiment, a processor comprises decode logic that determines an instruction type for each instruction fetched, a first level cache, a second level cache coupled to the first level cache, and control logic operatively coupled to the first and second level caches. The control logic preferably causes cache linefills to be performed to the first level cache upon cache misses for a first type of instruction (e.g., a load, store, direct memory access, pre-fetch), but precludes linefills from being performed to the first level cache for a second type of instruction. The control logic may comprise a load/store unit for executing instructions of the first type and a co-processor for executing instructions of the second type. In general, whether or not to perform the linefill on a miss turns on the type of instruction (e.g., SIMD instruction versus non-SIMD instruction) and/ or whether the co-processor or the load/store unit is to execute the instruction.

A method is also disclosed that comprises determining a type of instruction. If an instruction is of a first type and results in a miss to a first level cache, the method comprises performing a linefill to the first level cache. However, if an instruction is of a second type and results in a miss to the first level cache, the method comprises not performing a linefill to the first level cache. In other embodiments, an instruction of the second type such as a load may cause the requested data to be loaded from external memory (i.e., without involvement of the cache subsystem) and provided, for example, to a co-processor.

These and other embodiments are disclosed herein.

BRIEF DESCRIPTION OF THE DRAWINGS

For a detailed description of exemplary embodiments of the invention, reference will now be made to the accompanying drawings in which:

FIG. 2 shows a method in accordance with a preferred embodiment; and

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers broadly to a collection of two or more components and may be used to refer to an overall system as well as a subsystem within the context of a larger system.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
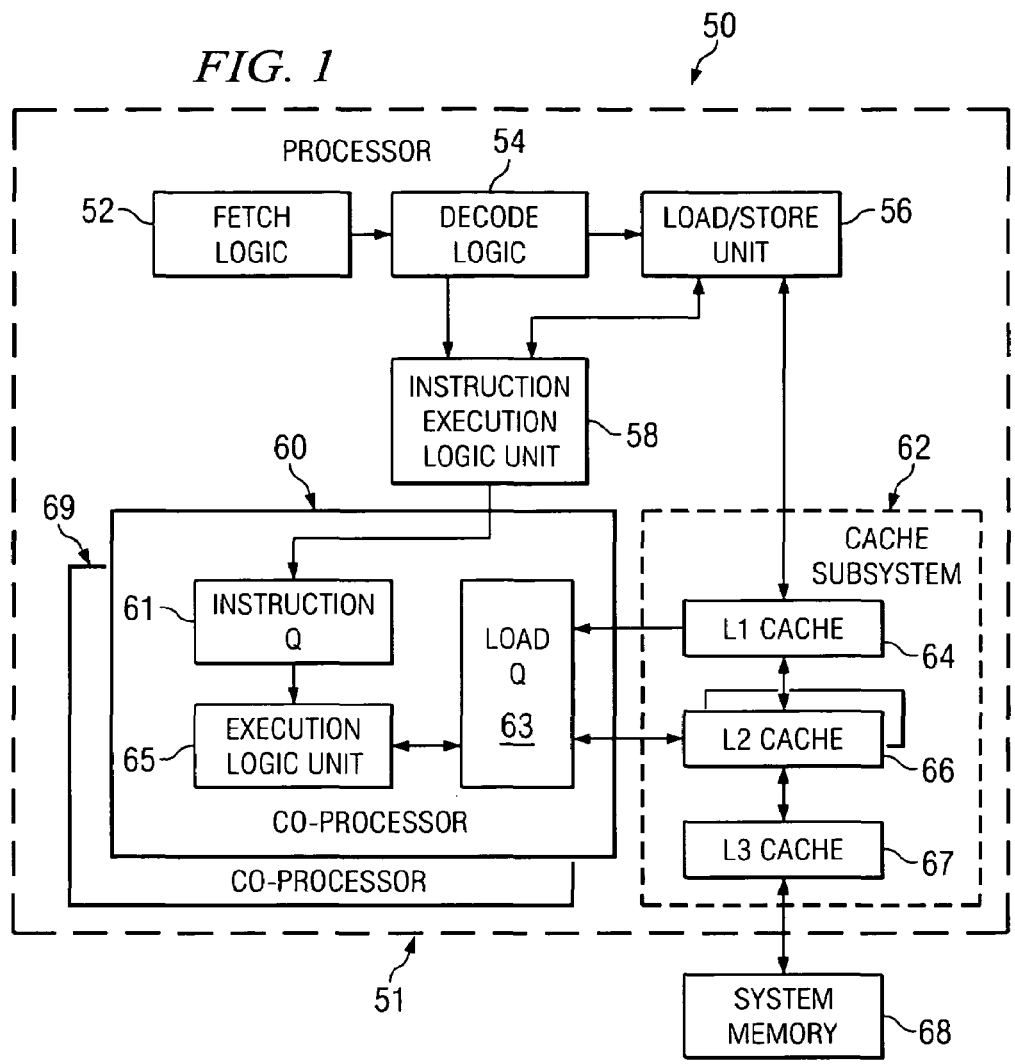
FIG. 1 shows a processor architecture having a cache subsystem in accordance with a preferred embodiment of the invention.

FIG. 1 shows a preferred embodiment of a system 50 that comprises a processor 51 coupled to system memory 68. The processor preferably comprises fetch logic 52, decode logic 54, a load/store unit 56, a processor instruction execution logic unit 58, a co-processor 60, and a cache subsystem 62. The cache subsystem 62 comprises a first level cache ("L1") coupled to a second level cache ("L2"). In accordance with at least one embodiment, the L1 cache comprises a 32 Kilobyte buffer, while the L2 cache comprises a 256 kilobyte buffer.

In general, the fetch logic 52 fetches instructions from, for example, system memory 68, or elsewhere, and provides the fetched instructions to the decode logic 54. The decode logic 54 examines an operational code ("opcode") in each instruction to determine the kind of instruction so that the instruction can be appropriately processed. In general, the instructions may be loads, stores, adds, multiplies, etc. A load instruction causes target data to be retrieved from memory and provided to a register (not specifically shown) in the processor. A store instruction causes data to be written to a specific address in memory. Add instructions cause two operands to be added together and multiplies cause two operands to be multiplied together as is commonly understood. Other kinds of instructions are possible as well such as direct memory accesses (DMAs) and pre-fetches.

The co-processor 60 comprises at least an instruction queue 61, a data load queue 63, and an execution logic unit 65. The co-processor 60 may include other logic as well such decode logic to decode instructions. The instruction queue 61 or execution logic unit 65 may include the decode logic. The co-processor 60 may include other components and logic as well as desired. The instruction queue 61 stores instructions (e.g., loads, stores, etc.) received via the instruction execution logic unit 58 pending execution by the execution logic unit 65. Data retrieved from the cache subsystem and/or memory 68 from a load instruction is stored in the load queue 63 pending consumption by the execution logic unit 65. In some embodiments, the co-processor 60 executes single instruction multiple data ("SIMD") instructions while the instruction execution logic 58 executes non-SIMD instructions. While in one embodiment, the co-processor 60 is intended to execute SIMD instructions, in other embodiments, the co-processor 60 may execute other types of instructions. In general, load and store instructions are executed by the load/store unit 56. Load data from the cache subsystem 62 is provided to the instruction execution logic 58 or co-processor 60 depending on the type of load instruction.

In some embodiments, more than one co-processor may be provided. In FIG. 1, a second co-processor 69 is shown. More than two co-processors may be provided as desired. Also, the cache subsystem 62 may include more than just a single L1 cache and a single L2 cache. For example, multiple L2 caches may be included. By way of further example, additional levels of caches can be provided, such as the L3 cache 67 shown in FIG. 1. Additional levels of cache besides the three depicted in FIG. 1 can be provided as well and multiple types of each level of cache can be included. The L2 cache(s) can comprise a memory system such as a stream buffer, a block of random access memory ("RAM") with contiguous address memory space, and the like.

Non-load/store instructions (e.g., adds, multiplies, etc.) are provided to either of the instruction execution logic unit 58 or co-processor 60 depending on the "type" of instruction. In general, instructions of a first type are provided to the instruction execution logic unit 58 for further processing and instructions of a second type are provided to co-processor 60 for further processing. The type of instruction can be ascertained by examining the instruction's operational code ("opcode"). SIMD instructions generally have opcodes that are distinguishable from non-SIMD instructions. In at least some embodiments, the instruction execution logic unit 58 comprises an integer execution unit that operates on data that tends to have relatively high spatial and/or temporal locality. Accordingly, the data operated on by the instruction execution logic unit 58 tends to be well-suited for storage in the cache subsystem's L1 cache. The co-processor 60 executes instructions that operate on data that may have relatively low spatial and/or temporal locality or instructions/applications that require access to a relatively large memory space or require relatively high bandwidth, and, as such, may not be well-suited for storage in the L1 cache. Such instructions may comprise SIMD instructions, floating point instructions, and other multimedia-based instructions.

The first and second types of instructions introduced above also apply to load and store instructions. Load and store instructions of the first type are provided to the load/store unit 56 for further processing to execute the loads and stores and loads and stores of the second type are provided to the co-processor 60 for execution. Loads and stores of the first type target data that is subsequently used by the instruction execution logic unit 58 and loads and stores of the second type target data that is subsequently used by the co-processor 60. As such, the target data of a load or store may be data from a data set that has high or low spatial and/or temporal locality. Moreover, the load and store target data may or may not be well-suited for storage in the L1 cache. No restriction is placed on the level of spatial and/or temporal locality that delineates which data is well-suited for L1 cache usage and which is not well-suited for L1 cache usage.

In some embodiments, the usage of the L1 cache for storing data depends on the nature of the data. Data with relatively low spatial and/or temporal locality preferably is precluded from being stored in the L1 cache. All other data is permitted to be stored in the L1 cache. In accordance with the preferred embodiments, processor 51 uses a type associated with each load instruction as a proxy for determining whether the target data of the load may have high or low spatial and/or temporal locality. A first type (mentioned above) of load refers to a load (e.g., an integer load) that operates on data that tends to have relatively high temporal and/or spatial locality. Such target data is used by the instruction execution logic units 58 as explained above. A second type of load refers to a load (e.g., a SIMD load) that operates on data that tends to have relatively low temporal and/or spatial locality. Such target data is used by the instruction execution logic units 60 as explained above. As noted above, the types of loads are determined from the instructions' opcodes. In some embodiments, whether or not certain data is to be stored in the L1 cache depends on whether the data is accessed and used by the execution logic unit 58 or by co-processor 60. Thus, data sets having relatively low spatial or temporal locality may still be stored in L1 cache.

In accordance with a preferred embodiment of the invention, the load/store unit 56 handles load instructions that are associated with the first type. The load/store unit 56 handles such loads differently than load instructions of a second type which are processed by co-processor 60. Similarly, the load/store unit 56 may handle stores differently than stores of the second type which are handled by the co-processor 60. The "types" of loads and stores that cause a difference in treatment by the load/store unit 56 can be any suitable types such as those provided above.

If a load is of the first type (e.g., an integer load), the load/store unit 56 will react as follows. The L1 cache 64 is checked to determine if the data targeted by the load is already resident in the L1 cache. If the load hits in the L1 cache, then the data is retrieved from the L1 cache. If, however, the load misses in the L1 cache, then the L2 cache is checked and accesses to the L1 cache will stall until the memory reference is resolved. If the load hits in the L2 cache, then a "linefill" operation is preferably performed to write the target data from the L2 cache into the L1 cache. A linefill includes writing an entire cache line, including the target data, to the L1 cache. In at least one embodiment of the invention, a cache line size is 64 bytes. If the load misses in the L2 cache, then a linefill is performed to retrieve the data from system memory 68 to fill the corresponding lines in the L1 and/or L2 caches.

If the load is of the second type (e.g., SIMD load), the co-processor 60 will react as follows. The L1 cache 64 is checked to determine if the data targeted by the load is already resident in the L1 cache. If the load hits in the L1 cache, then the data is retrieved from the L1 cache. If, however, the load misses in the L1 cache, then the L2 cache is checked. If the load hits in the L2 cache, the co-processor 60 precludes a "linefill" operation from being performed, or otherwise does not perform a linefill, thereby precluding the target data (which may be associated with a data set that has relatively low spatial and/or temporal locality) from being moved into the L1 cache. If the load misses in the L2 cache, then a linefill is performed to retrieve the data from system memory 68 to fill the corresponding line in the L2 cache, but no linefill is performed to the L1 cache. Alternatively, if the load misses in the L2 cache, the data is returned from external system memory 68 and no linefills of either cache (L1 or L2) are performed. A load of the second type is handled by the load queue 61 of the co-processor. Thus, even if there is an L1 or L2 cache miss, such a miss does not stall the processor 51 from accesses to the L1 cache for loads of the first type. Accordingly, the extended access times of L2 cache does not effect the performance of the processor for either type of data access (e.g., the first type or second type noted above).

Loads of the first type result in L1 cache linefills upon an L1 cache miss, whereas loads of the second type do not cause linefills to the L1 cache to be performed upon an L1 cache miss. If the target data happens to already be in the L1 cache, which might happen, for example, as a result of loads of the first type, then the target data is supplied from the L1 cache regardless of the type of load. Alternatively stated, in at least some embodiments all load instructions whose data is to be processed by the co-processor 60 are processed without L1 cache linefills. Conversely, all load instructions associated with the instruction execution logic unit 58 are processed with L1 cache linefills. Determining the type of the load instruction may comprise examining at least a portion of the load instruction's opcode to determine which instruction execution logic unit is appropriate for processing the data targeted by the load. The L2 cache effectively functions as an L1 cache with respect to certain types of load instructions (e.g., SIMD, floating point and multi-media instructions) processed by co-processor 60. Thus, the processor 51 comprises control logic that operatively couples to the first and second level caches and that causes cache linefills to be performed to the first level cache upon cache misses for a first type of load instruction (e.g., a non-SIMD instruction), but precludes linefills from being performed to the first level cache for a second type of load instruction (e.g., an SIMD instruction). The control logic comprises processor instruction execution logic 58 for processing the first type of loads and the co-processor for processing the second type of loads. In other embodiments, the function performed by the load/store unit 56 may be subsumed within the instruction execution logic unit 58.

In some embodiments, no linefills are performed on misses of store instructions. In other embodiments, store instructions may be processed similar to load instructions as explained above. That is, a store instruction of a certain type (e.g., the first type noted above) is handled as follows. The L1 cache 64 is checked to determine if the data targeted by the store is already resident in the L1 cache. If the store hits in the L1 cache, then the target data is updated in the L1 cache. If, however, the store misses in the L1 cache, then the L2 cache is checked. If the store hits in the L2 cache, then a "linefill" operation is performed to write the target cache line from the L2 cache into the L1 cache and then update the L1 cache with the store's data. If the store misses in the L2 cache, then a linefill is performed to retrieve the data from system memory 68 to fill the corresponding lines in the L1 and/or L2 caches and then update the cache line in the L1 cache with the store's data.

If the store is of another type (e.g., the second type noted above), a similar process is followed from that described in the preceding paragraph except that L1 linefills are not performed to bring the target data into the L1 cache. The types of stores that dictates the treatment of the data with respect to the L1 cache may be the same or different as the types discussed above with respect to loads. For example, the type of load that results in no L1 cache linefills may be the same type (or different) of store that also results in no L1 cache linefills and may be based on whether execution logic unit 58 or co-processor 60 is handling the store.

FIG. 2 shows a method 100 of processing load and store instructions in accordance with a preferred embodiment. The method comprises fetching an instruction at 102 and decoding the instruction at 104. If the instruction is a load, then the method continues at 106. If the instruction is a store, then the method continues at 120. First, the processing of a load will be described followed by a description of the processing of store.

At 106, method 100 comprises checking the L1 cache for the data requested by the load instruction. If the load hits in the L1 cache, as determined at decision 108, control passes to 110 at which the target data is retrieved from the L1 cache. If, however, there is a miss in the L1 cache, then at 112 the requested data is retrieved from the L2 cache assuming that the target data is already resident in the L2 cache. If it is not, the data is retrieved from system memory 68 with a copy being brought into the L2 cache for subsequent use. At 114, the method comprises performing an L1 cache linefill if the load is of a first type, but not if the load is of a second type. As explained above, the "first" type of load corresponds to loads (e.g., integer loads) that are performed by execution logic unit 58 and/or that operate on a data sets that may have relatively high spatial and/or temporal locality, while the "second" type of load corresponds to loads (e.g., SIMD, floating point) that are performed by co-processor 60 and/or that operate on data sets that may have relatively low spatial and/or temporal locality. Other delineations between the types of loads that prompt linefills to sometimes, but not always, be performed are possible as well.

If the instruction is a store, then the method flows from action 104 to 120 at which the L1 cache is checked for a hit. If the store hits in the L1 cache (decision 122), then the store updates the relevant cache line in the L1 cache at 124. If, however, there is a miss in the L1 cache for the store, then either action 126 or 128 is performed depending on the instruction type. If the store instruction is of the first type (126), a linefill to the L1 cache is performed to bring the relevant cache line into the L1 cache and that line is updated with the store instruction's data. If the store instruction is of the second type (128), then the relevant line in the L2 cache is updated (assuming the data is already in the L2 cache or the data is brought into the L2 cache if it was not already there). No linefill is performed to the L1 cache for stores of the second type. In other embodiments, no linefills are performed on L1 misses from stores regardless of store instruction type.

In embodiments that have more than two levels of cache (e.g., an L1, L2, and L3 cache), the various levels of cache can be used and accessed depending on instruction. That is, the concepts explained above with regard to the L1 and L2 cache can be extended to additional levels of cache. An instruction's opcode can be decoded and, based on the opcode, cache linefills are performed or not performed as explained above to certain levels of cache.

For example, a particular load instruction type may operate as follows. The L1 cache is checked first. If the requested data is in L1 cache, then the data is provided therefrom. If the L1 misses, then the L2 cache is checked. If the requested data is of a particular type, then a hit in the L2 cache causes the data to be returned from the L2 cache and no linefill to be performed to the L1 cache. If, however, the L2 cache misses, then the L3 cache is checked. If the requested data is of a particular type (which may be the same or different than the "particular type" mentioned immediately above), an L3 cache hit causes the data to be returned from the L3 cache and no linefills to be performed to either of the L1 or L2 caches. Alternatively, a linefill could be precluded from occurring to the L1 cache upon an L3 cache hit, and a linefill could be permitted to the L2 cache. The concepts noted above with regard to other types of instructions (i.e., loads, DMAs, pre-fetches) can be extended in this way as well.

As noted above, multiple caches of each type could be provided (e.g., multiple L2 caches). Accordingly, some instructions that targets one particular L2 cache could operate to preclude or permit L1 cache linefills as explained above, while other instructions that target a different L2 cache could operate to always perform linefills to the L1 cache upon a miss in L1 cache and hit in the L2 cache.

In some embodiments, the processor 50 is generally an "in-order" processor meaning that instructions are generally executed in program order. However, some SIMD loads (executed by co-processor 60) may require multiple memory loads to complete. That is, data to be retrieved from memory may require a first load cycle and a second load cycle. Such multiple load cycles may be required, for example, depending on the width of the bus to the cache subsystem 62 relative to the size of the target data. As explained above, the target data may or may not be present in the L1 cache 64. Further, it is possible that the first load cycle noted above results in an L1 cache miss while the second load cycle results in an L1 cache hit. Continuing this example, it is thus possible that the target data of the second load cycle is returned before the target data of the first load cycle due to the first load cycle's L1 cache miss. The co-processor 60 preferably keeps track of the data that is returned, which may be out of order, and is able to re-align the load data into the proper order despite the two load cycles returning their target data out of order.

Figure 3:
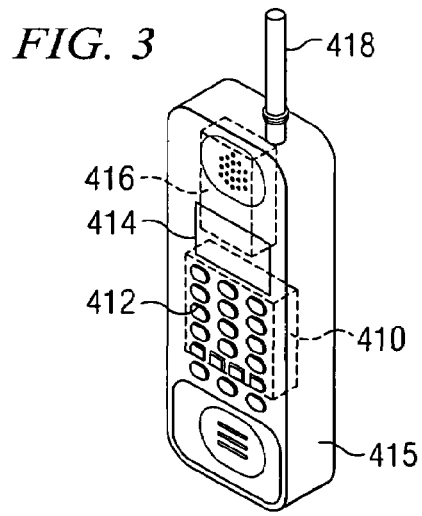
FIG. 3 shows an embodiment of the system in the form a battery-operated and communication device.

FIG. 3 shows an exemplary embodiment of a system containing the features described above. The embodiment of FIG. 3 comprises a battery-operated, wireless communication device 415. As shown, the communication device includes an integrated keypad 412 and a display 414. The cache subsystem described above and/or the processor containing the above cache subsystem may be included in an electronics package 410 which may be coupled to keypad 412, display 414 and a radio frequency ("RF") communication transceiver 416. The RF circuitry 416 preferably is coupled to an antenna 418 to transmit and/or receive wireless communications. In some embodiments, the communication device 415 comprises a cellular telephone.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processor, comprising:
    decode logic that determines an instruction type for each instruction fetched;
    a first level cache;
    a second level cache coupled to the first level cache; and
    control logic operatively coupled to the first and second level caches and that causes cache linefills to be performed to the first level cache upon cache misses for a first type of instruction, but precludes linefills from being performed to the first level cache for a second type of instructions, wherein said second type of instructions comprise instructions selected from the group consisting of single instruction multiple data ("SIMD") instructions, floating point instructions, and multi-media instructions.

2. The processor of claim 1 wherein the control logic comprises a processor instruction execution logic unit that causes an instruction of the first type to be performed and a co-processor that causes an instruction of the second type to be performed.

3. The processor of claim 2 wherein the co-processor comprises an instruction queue coupled to an execution logic unit.

4. The processor of claim 3 wherein the co-processor further comprises a data load queue.

5. The processor of claim 1 wherein the first and second types of instructions comprise first and second types of load instructions.

6. The processor of claim 5 wherein the control logic precludes linefills to said first level cache from being performed upon a first level cache miss from a store instruction that is of a third type, but permits linefills to said first level cache to be performed upon a first level cache miss from a store instruction that is of a fourth type.

7. The processor of claim 6 wherein the second and third types are the same and the first and fourth types are the same.

8. The processor of claim 1 further comprising first and second instruction execution logic units and wherein the first type of instruction targets data that is be processed by the first instruction execution logic unit and the second type of instruction targets data that is be processed by the second instruction execution logic unit.

9. The processor of claim 1 wherein the instruction comprises a load, a write, a direct memory access, or a pre-fetch.

10. The processor of claim 1 further comprising a third level cache coupled to the second level cache and wherein said control logic causes cache linefills to be performed to the first and second level caches upon cache misses for the first or second types of instructions, but precludes linefills from being performed to the first and second level caches for a third type of instruction.

11. The processor of claim 1 further comprising an additional second level cache coupled to the first level cache and wherein said control logic causes cache linefills to be performed or not performed depending on which of the second level caches is targeted by said instruction.

12. The processor of claim 11 wherein the second level caches comprise a memory system selected from a group consisting of a stream buffer and block of random access memory with contiguous memory address space.

13. A system, comprising:
a communication transceiver;
a cache subsystem operatively coupled to said communication transceiver, said cache subsystem comprising a first level cache coupled to a second level cache;
a load/store unit operatively coupled to the first and second level caches;
a co-processor operatively coupled to the first and second level caches;
wherein said load/store unit causes cache linefills to be performed to the first level cache upon cache misses for a first type of instruction, and said co-processor precludes linefills from being performed to the first level cache for a second type of instruction;
wherein the co-processor receives out-of-order data values and re-aligns such data values.

14. The system of claim 13 wherein the system comprises a cellular telephone.

15. The system of claim 13 wherein the co-processor precludes said linefills to said first level cache for floating point load instructions.

16. The system of claim 13 wherein the first and second types of instructions comprise first and second types of load instructions.

17. The system of claim 16 wherein the co-processor precludes linefills to said first level cache from being performed upon a first level cache miss from a store instruction that is of a third type, and wherein said load/store unit permits linefills to said first level cache to be performed upon a first level cache miss from a store instruction that is of a fourth type.

18. The system of claim 17 wherein the second and third types are the same and the first and fourth types are the same.

19. The system of claim 13 wherein the co-processor comprises a data load queue coupled to an execution logic unit.

20. The system of claim 19 wherein the co-processor further comprises an instruction queue.

21. The system of claim 13 wherein, for an instruction of the second type, the load/store unit detects a hit in the first level cache and loads data from the first level cache into the co-processor.

22. The system of claim 13 further comprising a third level cache coupled to the second level cache and wherein said control logic causes cache linefills to be performed to the first and second level caches upon cache misses for a third type of instruction, but precludes linefills from being performed to the first and second level caches for a fourth type of instruction.

23. The system of claim 13 further comprising an additional second level cache coupled to the first level cache and wherein said control logic causes cache linefills to be performed or not performed depending on which of the second level caches is targeted by said instruction.

24. The system of claim 23 wherein the second level caches comprise a memory system selected from a group consisting of a stream buffer and block of random access memory with contiguous memory address space.

25. A method, comprising:
determining a type of instruction based on an opcode;
if an instruction is of a first type and results in a miss to a first level cache, performing a linefill to said first level cache; and
if an instruction is of a second type and results in a miss to the first level cache, not performing a linefill to said first level cache;
wherein said second type of instruction comprise an instruction selected from the group consisting of single instruction multiple data ("SIMD")instructions, floating point instructions, and multi-media instructions.

26. The method of claim 25 further comprising if the instruction is of the second type and results in a hit to the first level cache, loading data from the first level cache.

27. The method of claim 25 wherein the instruction comprises a load, a store, a direct memory access, or a pre-fetch.

28. The method of claim 25 wherein determining the type of instruction comprises examining at least a portion of an operational code in the instruction.

* * * * *